United States Patent
Krämer et al.

(10) Patent No.: US 6,318,206 B1
(45) Date of Patent: Nov. 20, 2001

(54) SHIFT ROCKER

(75) Inventors: Klaus Krämer, Baudenbach; Arnold Trissler, Herzogenaurach, both of (DE)

(73) Assignee: Ina Wälzlager Schaeffler oHG, Herzogenaurach (DE)

( * ) Notice: Subject to any disclaimer, the term of this patent is extended or adjusted under 35 U.S.C. 154(b) by 0 days.

(21) Appl. No.: 09/553,995

(22) Filed: Apr. 20, 2000

(30) Foreign Application Priority Data

Apr. 28, 1999 (DE) .............................. 199 19 270

(51) Int. Cl.[7] .................................. F16H 63/30
(52) U.S. Cl. ....................... 74/473.37; 74/473.36
(58) Field of Search .................. 74/473.37, 473.36, 74/473.1, 471 R

(56) References Cited

U.S. PATENT DOCUMENTS

| | | | |
|---|---|---|---|
| H295 | * | 7/1987 | Numazawa et al. ............... 74/473 R |
| 5,471,893 | * | 12/1995 | Newbigging ........................... 74/335 |
| 5,802,916 | | 9/1998 | Ebinger et al. . |
| 6,038,938 | * | 3/2000 | Szczepanski et al. ............. 74/473.24 |
| 6,122,983 | * | 9/2000 | Hoffman ............................. 74/337.5 |

FOREIGN PATENT DOCUMENTS

| | | |
|---|---|---|
| 24 56 962 A1 | 6/1975 | (DE) . |
| 27 50 275 A1 | 5/1979 | (DE) . |
| 07 94 364 A2 | 9/1997 | (EP) . |

* cited by examiner

Primary Examiner—David Fenstermacher
(74) Attorney, Agent, or Firm—Henry M. Feiereisen

(57) ABSTRACT

A shift rocker for use in a gear shift mechanism, includes a bracket of forked configuration, with the bracket having spaced-apart sidewalls in parallel relation for axially displacing a shift sleeve, and an arched cross member interconnecting the sidewalls. Connected to the cross member of the bracket for introduction of force is a rail which includes, directly or indirectly, a shift slot for engagement of a shift finger in fixed rotative engagement with a shift shaft, a latch contour for a separate stationary shift latching means, and a receiving member for engagement of a locking lever of a locking unit to inhibit a shifting movement of the shift rocker when the shift rocker is inactive.

21 Claims, 3 Drawing Sheets

SHIFT ROCKER

CROSS-REFERENCES TO RELATED APPLICATIONS

This application claims the priority of German Patent Application, Ser. No. 199 19 270.7, filed Apr. 28, 1999, the subject matter of which is incorporated herein by reference.

BACKGROUND OF THE INVENTION

The present invention relates, in general, to a shift device for use in a gear shift mechanism, and more particularly to a shift rocker for translating a shift motion, for example from a manually operated gearshift lever to a change-speed gearbox or synchronizing device, to implement a selective coupling of gearshafts.

Typically, a conventional shift rocker has two sidewalls for positive engagement in a shift sleeve which is coupled to a gear. The shift rocker is a multi-part structural element and further connected via a shift slot to a shift finger which is in fixed rotative engagement with a shift shaft. Supported in a latch contour of the shift rocker is a separate spring-loaded shift latching means to secure a precise position of the shift rocker in each shifting position. A locking lever of a locking unit is operatively connected to the shift rocker to lock the shift rocker when inactive.

U.S. Pat. No. 5,802,916, issued on Sep. 8, 1998, describes a fork-shaped shift rocker which encloses the shift sleeve, with the shift sleeve swingably supported in parallel sidewalls of the shift rocker which are interconnected by a cross member. Additional devices are arranged on different sections of the shift rocker for force introduction. Secured to the cross member in midsection of the shift rocker is a driver which is guided along a longer region axially to the outer contour of the shift rocker. The driver has an angled portion which is formed with a recess to form a shift slot for a positive engagement of the shift finger. Offset to the point of securement of the driver, the shift rocker is further provided with a radial bracket for swingably mounting a locking lever. One sidewall has a U-shaped end, with the free end configured as latch contour. Consequently, this conventional structure has different force attack points upon the shift rocker so that the shift rocker requires a relative wide wall thickness in order to possess a sufficient torsional stiffness. Apart from the resultant weight increase, the manufacture is also complicated in view of the number of individual components which have to be attached to the shift rocker separately from one another.

SUMMARY OF THE INVENTION

It is thus an object of the present invention to provide an improved shift rocker, obviating the afore-stated drawbacks.

In particular, it is an object of the present invention to provide an improved shift rocker which exhibits a high moment of resistance and has a weight-optimized configuration while yet realizing a substantially symmetrical force introduction into the shift rocker.

These objects, and others which will become apparent hereinafter, are attained in accordance with the present invention by providing a bracket of forked configuration, with the bracket having spaced apart sidewalls in parallel relation for axially displacing a shift sleeve, and an arched cross member interconnecting the sidewalls; and by providing a rail which is connected to the cross member of the bracket for introduction of force, with the rail including, directly or indirectly, a shift slot for engagement of a shift finger in fixed rotative engagement with a shift shaft, a latch contour for a separate stationary shift latching means, and a receiving member for engagement of a locking lever of a locking unit to inhibit a shifting movement of the shift rocker when the shift rocker is inactive.

The configuration and disposition of the rail reinforces the bracket and thereby the overall moment of resistance of the shift rocker. The multiple functionality of the rail, by which a central force introduction into the shift rocker is realized, provides for a symmetrical force introduction, for example onto both sidewalls of the shift rocker. In addition, the provision of the rail, preferably a prefabricated rail, further reduces manufacturing costs and optimizes the weight.

According to another feature of the present invention, the rail has an inverted U-shaped configuration when secured to the cross member of the bracket. In the assembled state, the rail extends parallel to a longitudinal axis oriented through receiving bores of the sidewalls, whereby the rail has a free end which projects beyond the cross member at a distance to a cross member portion that is angled in the direction of the sidewalls.

Suitably, the receiving member of the rail is a recess or opening in the form of a punch-out hole for so receiving and securing the locking lever as to permit a swinging of the locking lever. The recess has a section extending transversely to the longitudinal axis of the shift rocker for guiding an end of the locking lever. A cylindrical pin mounted to the locking lever is received in a section of the recess which is oriented in the direction of the longitudinal axis.

According to another feature of the present invention, the rail supports at one end that is distant to the attachment area of the rail to the cross member, a flat member, e.g. flat iron, which partially projects out beyond the rail end. Impressed in the outwardly directed end of the flat member is the latch contour. The flat member defines a longitudinal axis and has a portion which is angled transversely to the longitudinal axis and inclined, in the assembled position, towards the center of the shift rocker at an angle of $\geq 20°$ with respect to the rail, with the shift slot being formed in the angled portion of the flat member for positive engagement of a shift finger.

Suitably, the bracket, the rail, and the flat member can be made in a cost-efficient manner by a non-cutting process, for example a deep-drawing process or a punching process.

The components, bracket, rail and flat member, are connected non-detachably to one another, preferably by a welding process. The lengths of the welding seams as well as the position of the welding seams between the rail and the bracket of the shift rocker may be, optionally, individually configured.

The design and disposition of the rail as U-section results in a significant reinforcement of the shift rocker in radial direction, i.e. direction of selection, as well as axial direction, i.e. direction of shift. At the same time, the inverted U-shaped rail enhances the reception of the locking lever and other components via which a force is introduced into the shift rocker.

A shift rocker according to the present invention displays a sufficient stiffness to ensure a precise, permanent shift of the gear shift mechanism.

BRIEF DESCRIPTION OF THE DRAWING

The above and other objects, features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Figure 1:
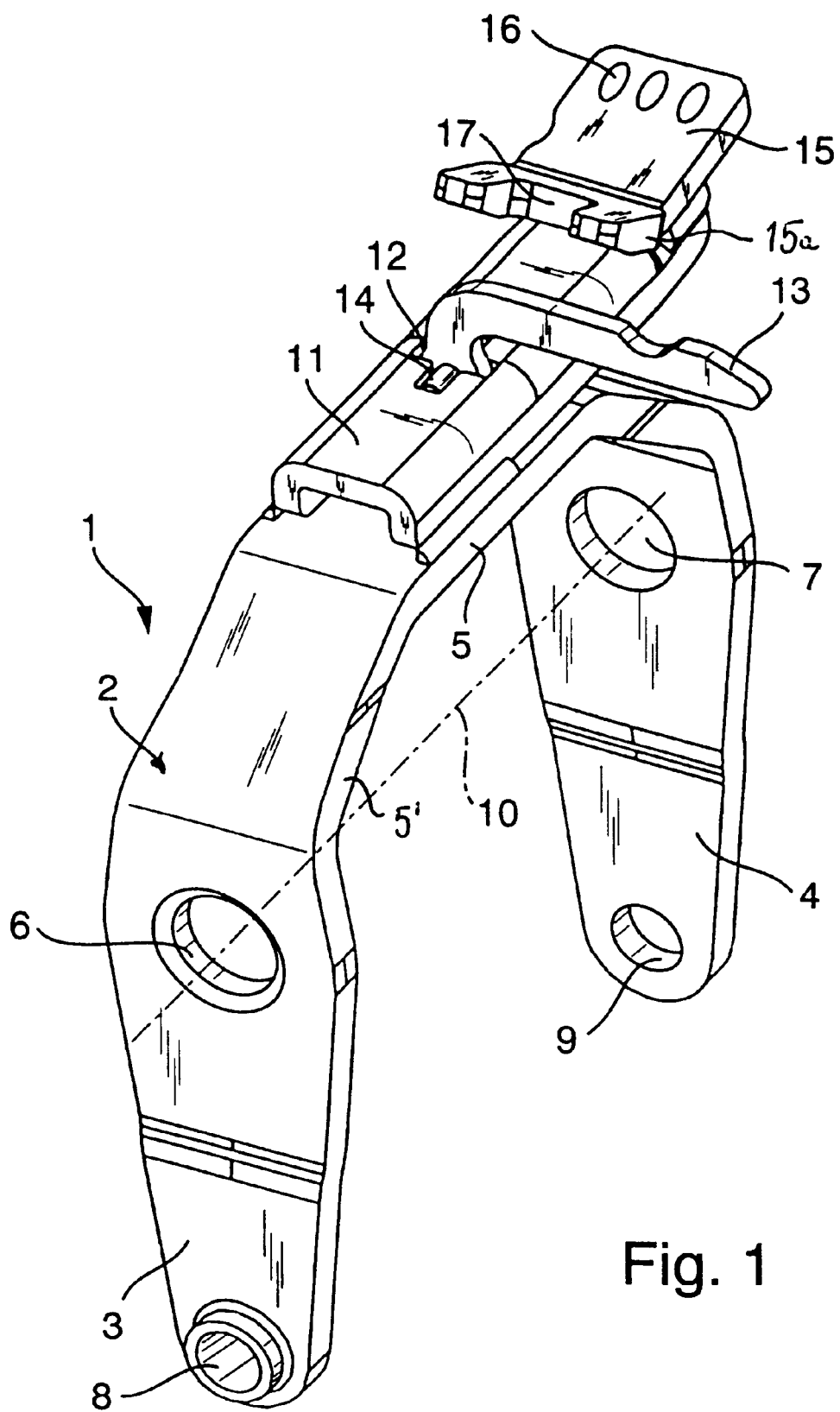
FIG. 1 is a perspective illustration of a shift rocker according to the present invention.

Throughout all the Figures, same or corresponding elements are generally indicated by same reference numerals.

Turning now to the drawing, and in particular to FIG. 1, there is shown a perspective illustration of a shift rocker according to the present invention, generally designated by reference numeral 1. The shift rocker has a U-shaped or fork-shaped bracket, generally designated by reference numeral 2 and including two spaced-apart sidewalls 3, 4 ("open jawed sidewalls") arranged in parallel disposition and an arched cross member 5 which interconnects the sidewalls 3, 4 via lateral, angled portions 5'. The sidewalls 3, 4 are formed with aligned bores 6, 7 for fixed engagement of trunnions (not shown) of a shift device or gearbox for formation of pivot bearings of the shift rocker 1. At their free end, each of the sidewalls 3, 4 is provided with an outwardly directed bearing bushing 8, 9 for positive engagement in an associated recess of a shift sleeve (not shown), when the shift rocker 1 is assembled. The bores 6, 7 of the sidewalls 3, 4 define a longitudinal axis 10, which substantially extends parallel to the cross member 5 of the bracket 2.

Secured non-detachably, for example via a welding seam 18, to the cross member 5 is a rail 11 which has an inverted U-shaped configuration and has one end projecting out beyond the respective lateral portion 5' of the cross member 5 in the direction of the sidewall 4. The rail 11 is provided with a cross-shaped recess or opening 12 for guiding and securing a locking lever 13 in position. At its rail-confronting end, the locking lever 13 is bent at a right angle and provided with a cylinder pin 14 which is received in an area of the recess 12 in parallel relation to the longitudinal axis 10 and captivated therein by impressions in the rail 11. In this context, reference is also made to commonly assigned co-pending patent application by a different inventive entity, entitled "Locking Lever for a Shift Rocker", filed simultaneously herewith and based on unpublished German patent specification 199 19 269.3, the disclosure of which is incorporated herein by reference.

Mounted to the cantilevered end of the rail 11 is a flat member 15 which is non-detachably secured, e.g. via a welding seam 19, to the rail 11 and formed with a latch contour 16 for interaction with a separate shift latching means for the shift rocker 1. The flat member 15 is preferably made of flat iron and has a portion 15a which is deflected at an angle with respect to the longitudinal axis of the flat member 15, as shown in particular in FIG. 2, so that the portion 15a is inclined with respect to the rail 11. At its free end, the portion 15a is formed with a shift slot 17 for guiding a shift finger.

Figure 2:
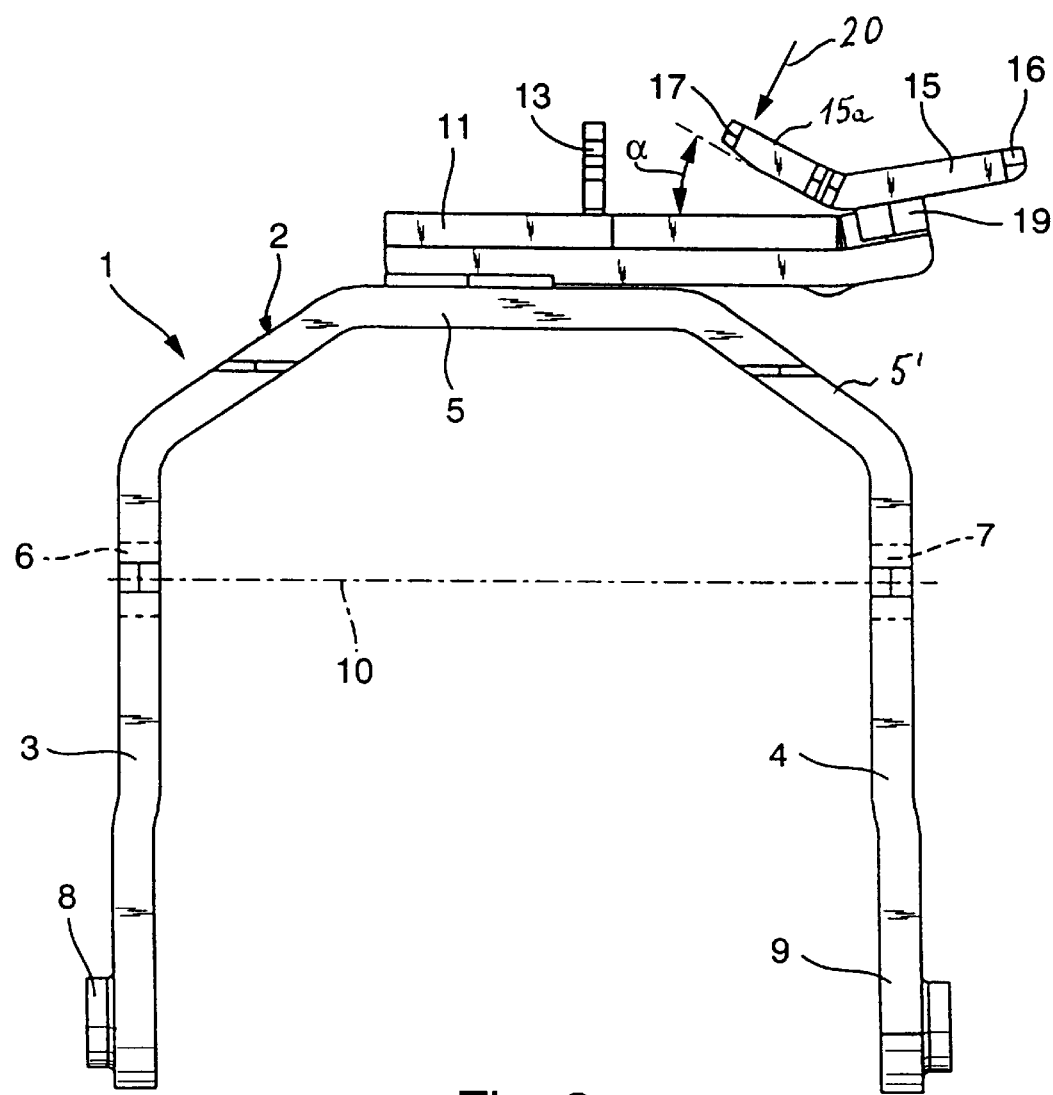
FIG. 2 is a front view of the shift rocker.

FIG. 2 more clearly depicts the geometric disposition and interrelation of the rail 11 and all other pertaining components with respect to the bracket 2 for formation of the shift rocker 1. Accordingly, the rail 11 is fixed at a central location to the cross member 5 to thereby ensure a nearly symmetric force introduction into the shift rocker 1. The length of the welding seams 18 on both sides of the rail 11 as well as the position of the welding seams 18 for securing the rail 11 to the bracket 2 can vary and individually be implemented, if required.

As further illustrated in FIG. 2, the configuration of the flat member 15 results in an introduction of force into the shift rocker 1 in an essentially radial direction via the shift slot 17. Arrow 20 illustrates the direction of a force, acting on the shift rocker 1 during pre-selection of the shifting operation. An unobstructed shifting or engagement of the shift finger in the shift slot 17 is realized by angling the portion 15a of the flat member 15 with respect to the outer contour of the rail 11 at an angle $\alpha$ of $\geq 20°$.

Figure 3:
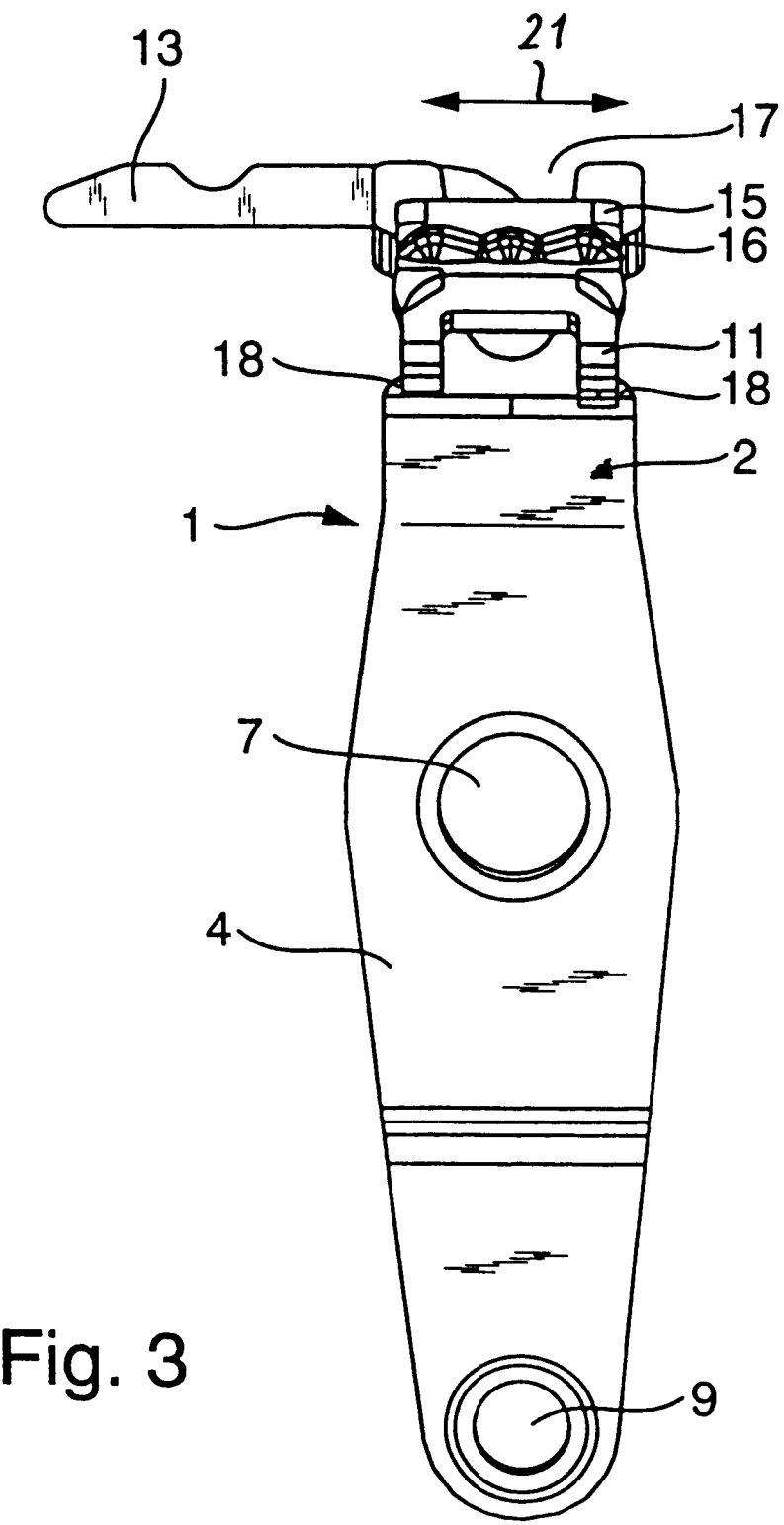
FIG. 3 is a side view of the shift rocker of FIG. 1.

FIG. 3 is a side view of the shift rocker of FIG. 1 and shows in particular the inverted disposition of the U-shaped rail 11 upon the bracket 2 to thereby realize locally a hollow section for improving the torsional stiffness of the shift rocker 1. This also establishes a sufficient component rigidity as far as axial forces, applied during shifting operation in a direction indicated by arrow 21, are concerned.

While the invention has been illustrated and described as embodied in a shift rocker, it is not intended to be limited to the details shown since various modifications and structural changes may be made without departing in any way from the spirit of the present invention.

What is claimed as new and desired to be protected by letters patent is set forth in the appended claims:

What is claimed is:

1. A shift rocker for use in a gear shift mechanism, comprising:

a bracket of forked configuration, said bracket having spaced apart sidewalls in parallel relation for axially displacing a shift sleeve, and an arched cross member interconnecting the sidewalls; and a rail connected to the cross member of the bracket for introduction of force, said rail including, directly or indirectly, a shift slot for engagement of a shift finger in fixed rotative engagement with a shift shaft, a latch contour for a separate stationary shift latching means, and a receiving member for engagement of a locking lever of a locking unit to inhibit a shifting movement of the shift rocker when the shift rocker is inactive.

2. The shift rocker of claim 1 wherein the rail has an inverted U-shaped configuration when non-detachably secured to the cross member of the bracket.

3. The shift rocker of claim 1 wherein each of the sidewalls has a bore, with the bore of one of the sidewalls and the bore of the other one of the sidewalls defining a longitudinal axis which is oriented in parallel relationship to the cross member, said rail having a free end which projects beyond the cross member.

4. The shift rocker of claim 1 wherein the receiving member of the rail is a recess or opening in the form of a punch-out hole for so receiving and securing the locking lever as to permit a swinging of the locking lever.

5. The shift rocker of claim 1 wherein the rail is secured to the cross member at an attachment area, and further comprising a flat member disposed on an attachment area distal end of the rail and partially projecting beyond said end of the rail, said flat member having one end formed with the latch contour.

6. The shift rocker of claim 5 wherein the flat member defines a longitudinal axis and has a portion which extends toward a center of the bracket and is deflected transversely to the longitudinal axis at an angle of $\geq 20°$ with respect to the rail.

7. The shift rocker of claim 6 wherein the portion has a center-proximal end face which is formed with the shift slot.

8. The shift rocker of claim 5 wherein the bracket, the rail, the locking lever and the flat member are made by a non-cutting process.

9. The shift rocker of claim 8 wherein the non-cutting process includes at least one of a deep-drawing process and a punching process.

10. The shift rocker of claim 5 wherein the bracket, the rail and the flat member are connected non-detachably to one another through a welding process.

11. A shift device for use in a gear shift mechanism, comprising:
- a shift rocker rotatable between an inactive position and an activated position through operation of a shift finger, which is fixedly mounted on a shift shaft, for axially displacing a shift sleeve;
- a locking lever operatively connecting a locking unit to the shift rocker and so operated as to inhibit a shifting movement of the shift rocker when the shift rocker is inactive,
- wherein the shift rocker includes a bracket having spaced-apart parallel sidewalls for axially displacing the shift sleeve, and a cross member interconnecting the sidewalls, and a rail connected at an attachment area to the cross member of the bracket and operatively connected to a shift finger in fixed rotative engagement with a shift shaft, said rail including a latch contour for engagement by a separate stationary shift latching means, and a receiving member for engagement of the locking lever.

12. The shift device of claim 11 wherein the rail has an inverted U-shaped configuration when non-detachably secured to the cross member of the bracket.

13. The shift device of claim 11 wherein each of the sidewalls has a bore, with the bore of one of the sidewalls and the bore of the other one of the sidewalls defining a longitudinal axis, said cross member having an arched configuration with a central portion extending parallel to the longitudinal axis.

14. The shift device of claim 11, wherein the rail has a free end which projects beyond the cross member.

15. The shift device of claim 11 wherein the receiving member of the rail is a recess for so receiving and securing the locking lever as to permit a swinging of the locking lever.

16. The shift device of claim 11, and further comprising a flat member connected to an attachment area distal end of the rail and partially projecting beyond said end of the rail, said flat member having one end formed with the latch contour.

17. The shift device of claim 16 wherein the flat member defines a longitudinal axis and has a portion which extends toward a center of the bracket and is deflected transversely to the longitudinal axis at an angle of $\geq 20°$ with respect to the rail.

18. The shift device of claim 17 wherein the portion has a center-proximal end face which is formed with a shift slot for engagement of a shift finger in fixed rotative engagement with a shift shaft.

19. The shift device of claim 16 wherein the bracket, the rail, the locking lever and the flat member are made by a non-cutting process.

20. The shift device of claim 19 wherein the non-cutting process includes at least one of a deep-drawing process and a punching process.

21. The shift device of claim 16 wherein the bracket, the rail and the flat member are connected non-detachably to one another through a welding process.

* * * * *